US006139684A

United States Patent [19]

Lawson et al.

[11] Patent Number: 6,139,684

[45] Date of Patent: Oct. 31, 2000

[54] METHOD AND APPARATUS FOR DECONTAMINATING LIQUID SUSPENSIONS

[75] Inventors: J. Alan Lawson; James W. Ramp, both of Dublin, Ga.

[73] Assignee: SEP Technologies, Inc., Dublin, Ga.

[21] Appl. No.: 09/169,461

[22] Filed: Oct. 9, 1998

[51] Int. Cl.[7] .......... D21C 9/08

[52] U.S. Cl. .......... 162/55; 162/232; 209/157; 209/173; 209/210

[58] Field of Search .......... 162/55, 232; 209/173, 209/157, 210, 156, 158, 159, 160, 161, 208

[56] References Cited

U.S. PATENT DOCUMENTS

| | | | |
|---|---|---|---|
| 4,199,110 | 4/1980 | Eriksson | 241/20 |
| 4,271,010 | 6/1981 | Guarascio | 209/211 |
| 4,332,638 | 6/1982 | Mauer et al. | 162/4 |
| 4,818,375 | 4/1989 | Dorph | 209/18 |
| 4,848,674 | 7/1989 | Hunter | 241/16 |
| 4,994,176 | 2/1991 | Yakunin et al. | 209/157 |
| 5,061,370 | 10/1991 | Ferland et al. | 210/194 |
| 5,397,469 | 3/1995 | Young | 210/304 |
| 5,407,538 | 4/1995 | Lamort | 162/232 |
| 5,478,441 | 12/1995 | Hamilton | 162/189 |
| 5,580,446 | 12/1996 | Markham | 210/202 |
| 5,733,413 | 3/1998 | Lawson | 162/55 |

FOREIGN PATENT DOCUMENTS

| | | |
|---|---|---|
| 057 0757 A1 | 11/1993 | European Pat. Off. . |
| 1475422 | 6/1977 | United Kingdom . |
| 2 003 756 | 5/1980 | United Kingdom . |
| 2 164 589 | 3/1986 | United Kingdom . |
| 91/17304 | 11/1991 | WIPO . |

OTHER PUBLICATIONS

Marson, M., "New Lightweight Cleaner Units Solve Mill's Plastic Problems." *Pulp & Paper*, Jun. 1990, vol. 64 No. 6, pp. 93–96.

Ferguson, L.D., "Through–Flow Cleaners", Paper presented at 1993 Deinking Short Course at Indianapolis, pp. 1–9, (Atlanta, Georgia, USA: TAPPI Press, 1992).

*Primary Examiner*—Peter Chin
*Assistant Examiner*—Rob McBride
*Attorney, Agent, or Firm*—Jones & Askew, LLP

[57] ABSTRACT

A method and apparatus for decontaminating a liquid suspension comprising a decontaminating cell. The decontaminating cell has an upper light contaminate collection hood and/or a lower heavy contaminate collection trough. A method and apparatus are provided for decontaminating a liquid suspension by infusing the suspension with a gas, mechanically agitating the suspension, or providing chemical additives thereto. The liquid suspension is then directed to the decontaminating cell under a pressure head sufficient to purge the contaminates therefrom.

19 Claims, 15 Drawing Sheets

Fig_ 9

ERIC Of Pressate Sample

METHOD AND APPARATUS FOR DECONTAMINATING LIQUID SUSPENSIONS

FIELD OF THE INVENTION

This invention relates in general to the decontamination of liquid suspensions, and in particular to the decontamination of aqueous paper pulp or clay slurry.

BACKGROUND OF THE INVENTION

In the art of paper manufacturing, decontamination of the paper pulp is of primary importance to achieve a consistent paper product. In particular, recycling waste paper requires extensive cleansing of the aqueous paper pulp to remove extraneous contaminates. Waste paper materials present a challenge to provide an economically feasible means of recycling which yields an acceptable paper product.

Contaminates may be grouped into one of three classes. First, elongated flexible materials, such as pieces of cord, fabrics and wire can be removed from the pulp relatively efficiently by a ragger, well-known in the art. A ragger is generally a rope trailing in the pulper vat upon which elongated material becomes entwined. Second, heavy materials, such as rocks and metal pieces, are typically removed with increased effort by screen filters or traps. Finally, light weight contaminates, such as plastics, styrofoam, wood, adhesives and entrained air, can be the most difficult to remove. Various approaches to the removal of light weight contaminates have been proposed, including screens and skimmer devices.

Pulp fiber screening technology has practical limits defined by screen pore size and hydraulic pressure. As finer screens have been developed to filter unwanted contaminates, increased hydraulic horsepower has been required to drive the pulp therethrough. However, the high degree of screening currently required to produce acceptable quality paper results in energy inefficiencies. The removal of light weight contaminates, such as foldable bits of plastic sheeting, are especially problematic to remove by conventional screening techniques.

Prior art collection traps for light weight contaminates are also unsatisfactory. Most such traps provide an open collection area for buoyant light weight contaminates, which are then skimmed off the top. This skimming action agitates the rising light weight contaminates, and recirculates them into the pulp batch. Skimmers also remove an undesirable amount of good paper fibers. Furthermore, this system requires an undesirable number of moving parts, which increases the likelihood of machine failure.

Traps for heavy contaminates in the prior art are also inadequate. Some models include a lower heavy contaminate collection pocket, which is periodically cleared by a grapple lowered from the top. Again, this requires unnecessary machinery and produces circulatory agitation, which prevents both light and heavy contaminates from efficiently separating.

Furthermore, such prior art devices do not permit a continuously adjustable range of decontamination depending upon the quality of the paper product desired. Prior art pulp decontaminators are also incapable of processing sufficiently large amounts of pulp to create an economy of scale.

Therefore, there exists in the art a long felt need for an improved pulp decontamination apparatus. Despite the apparent need for such pulp processing alternatives, there have been none which satisfactorily provide these desirable qualities. Accordingly, there is a need in the art for an improved apparatus and method for decontaminating pulp.

Furthermore, there exists in the art a need for a decontamination apparatus for purifying a variety of liquid suspensions.

OBJECTS OF THE INVENTION

Thus, it is an object of the present invention to provide an improved method and apparatus for decontaminating liquid suspensions.

It is an object of the invention to provide a liquid suspension decontaminating apparatus that has an improved configuration for removing light contaminates.

It is also an object of the invention to provide a liquid suspension decontaminating apparatus that has an improved configuration for removing heavy contaminates.

It is also an object of the invention to provide an apparatus that can be selectively adjusted for removing liquid suspension decontaminates to a desired degree.

It is also an object of the invention to provide a plurality of such individual liquid suspension decontaminating devices to create an efficient economy of scale.

Other objects, features, and advantages of the present invention will become apparent upon review of the following description of preferred embodiments and the appended drawings and claims.

SUMMARY OF THE INVENTION

The present invention provides a method and apparatus for decontaminating liquid suspensions comprising a decontaminating cell. The decontaminating cell has an upper light contaminate collection hood and/or a lower heavy contaminate collection trough. Liquid suspensions are provided to the cell under a pressure head sufficient to purge the contaminates therefrom. A method of decontaminating a liquid suspension is provided, as well as products made from the method. The methods of decontaminating liquid suspensions involve agitation of the suspension, and infusion of air and/or dispersant particles into the liquid suspension prior to directing the liquid into the decontaminating cell.

DETAILED DESCRIPTION

Figure 1:
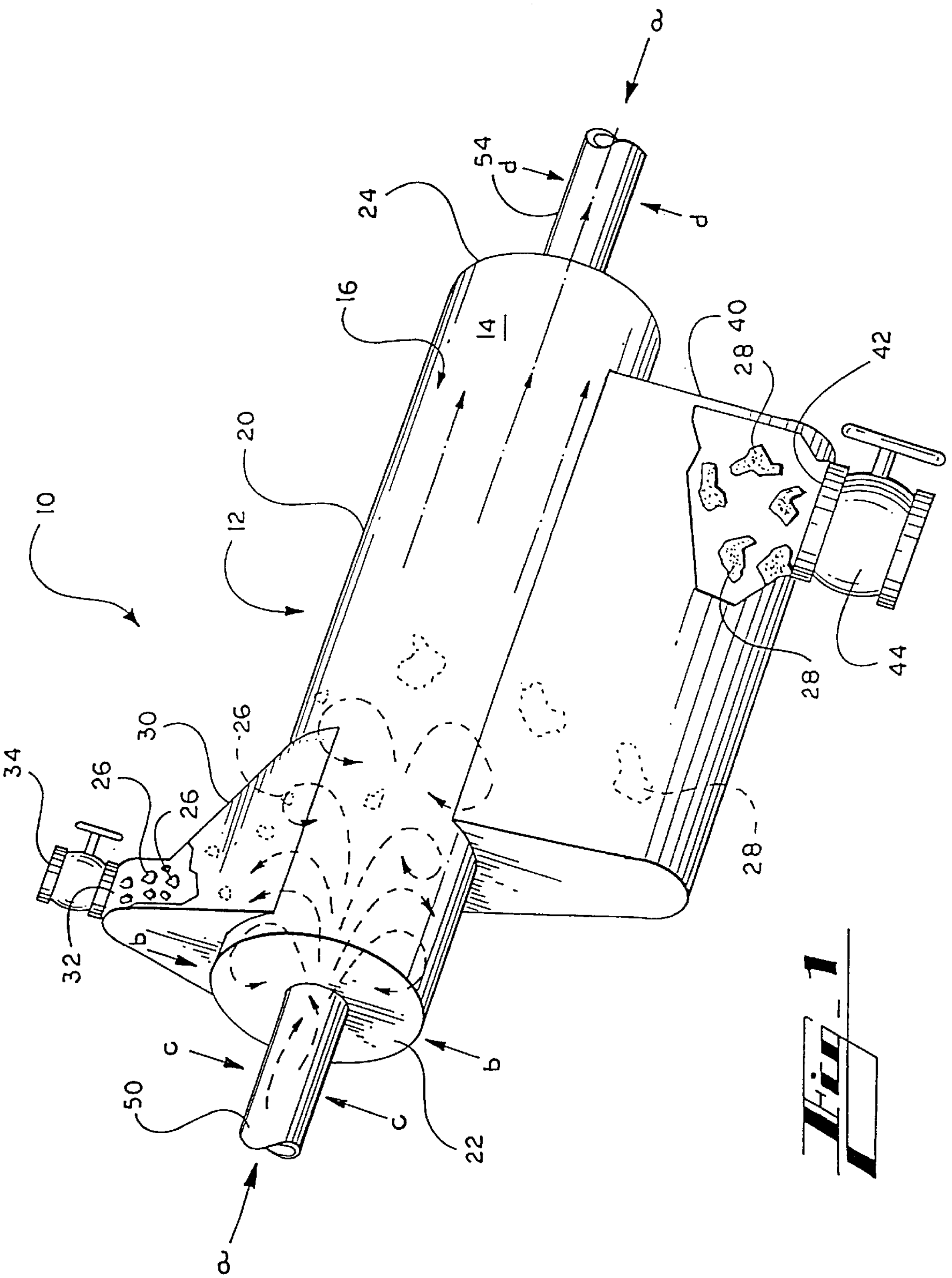
FIG. 1 is a perspective view of a cell according to the present invention for decontaminating liquid suspensions.

The invention contemplates that the present apparatus and methods can be used for decontaminating liquid suspensions from a variety of different sources. One such liquid suspension is aqueous paper pulp, preferably provided in a slurry form comprising wastepaper, such as recycled newsprint, mixed with a selected amount of water in a large, open-topped pulper tub. The wastepaper is pulped to paper fiber by impact with a rotary blade and vigorous agitation. The pulp may be mixed with more or less water, whitewater or other aqueous carrier, to provide an intended viscosity. The exact composition of the aqueous paper pulp will vary somewhat, however, preferably, the aqueous paper pulp is about 0.1% to 15% paper fiber, and more preferably about 5% paper fiber.

The apparatus and methods herein can be used for decontamination of paper pulp suspensions along any point of the paper production process. For example, the apparatus can be placed in the production stream between the stock solution stage, the cleaning screen stage, the washer stage, or the bleacher stage. Since recycling of the white water at several stages is common in the industry, for example with the pressate solution, the apparatus is also useful for removing decontaminates from such recycling loops in the process. In the decontamination of paper pulp with the present invention, typical industry chemical modifiers can also be used to assist in the removal of contaminates, such as surfactants, emulsifiers (e.g. alcohol ethoxylates), alkaline materials (e.g. sodium hydroxide), or collectors (e.g. poly-DAMAC).

The invention contemplates that the same apparatus can be used for decontaminating liquid suspensions from a variety of additional sources. Clay slurries that contain contaminates such as sand and metals (e.g. iron oxide or titanium oxide) can be decontaminated by the present invention. In particular, kaolin clay can be combined with water to form a liquid suspension for decontamination by the present apparatus.

The invention contemplates that any other material that can be suspended in a liquid can be decontaminated by the present apparatus. Examples of additional materials that can be suspended in a liquid and decontaminated by the present apparatus include waxes, soils, sands, wood and bark chips, plastics, rubbers, and metals. Furthermore, the invention can be used to separate contaminates in petroleum suspensions, such as sand in crude oil. The invention may also be used to decontaminate animal fats and oils from liquid suspensions.

By "light contaminate" is meant any undesirable materials in the liquid suspension which tend to rise upwards through the liquid suspension due to a buoyancy effect caused by a difference in specific gravity. Light contaminates can include for example inks, waxes, oils, fats, plastics, wood, styrofoam, chemicals, adhesives and air bubbles. By "heavy contaminate" is meant any undesirable materials in the liquid suspension which tend to sink downwards through the liquid suspension due to gravity. Heavy contaminates can include for example dense plastics, sand, rocks and metal materials. By "decontaminating liquid suspension" is meant that at least a portion of the light and/or heavy contaminates contained in a liquid suspension are separated from the paper fiber. A "contaminate" is any material which is undesirable in the liquid suspension and is capable of being removed by the apparatus of the present invention. As mentioned, the invention contemplates that the apparatus may be used to separate other liquid mixtures, in addition to paper pulp.

Figure 2:
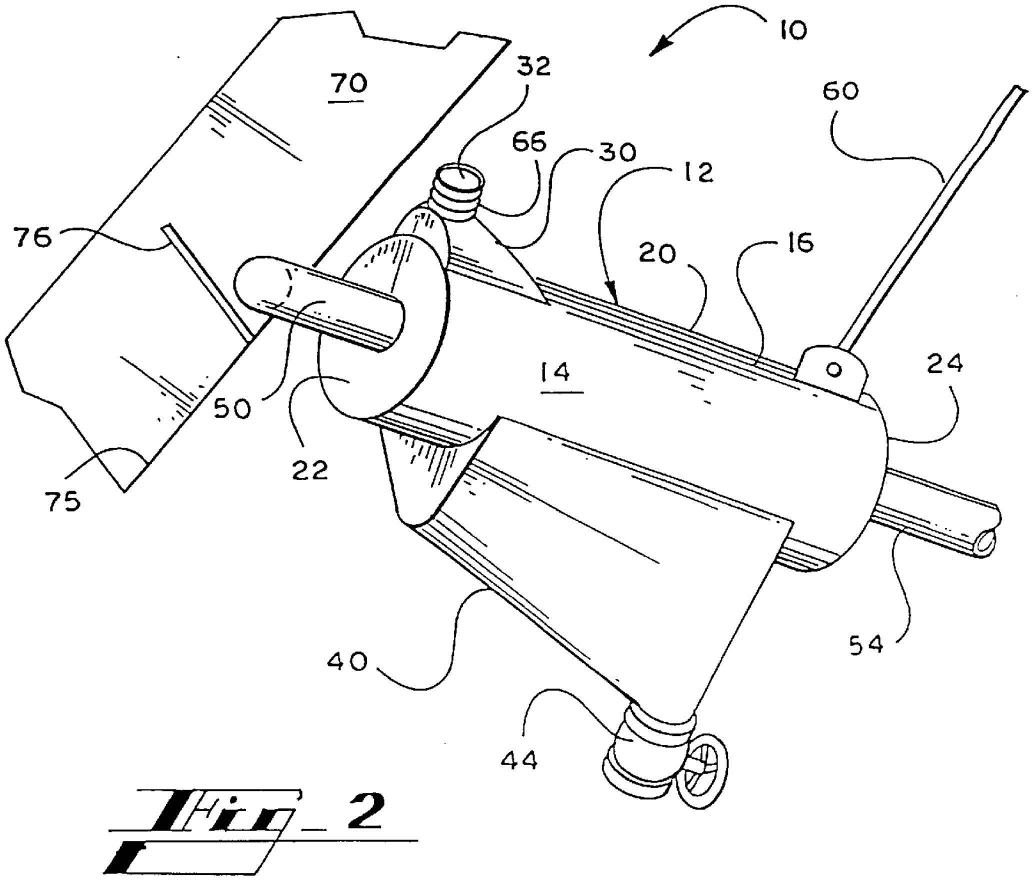
FIG. 2 is a perspective view of a cell according to the present invention for decontaminating liquid suspensions having a means for adjusting the decline of the longitudinal axis.

Referring now to the drawings, like numerals refer to like parts throughout the several views. As seen in FIGS. 1 and 2, the apparatus 10 for decontaminating a liquid suspension has an elongated cell 12 with a longitudinal axis taken along line a—a. The cell 12 has an exterior surface 14 and an interior surface 16 defining a liquid suspension decontaminating chamber 20. The liquid suspension decontaminating chamber 20 has an upstream liquid suspension receiving end 22 and a downstream liquid suspension discharging end 24. The cell 12 can be preferably oriented such that the liquid suspension receiving end 22 is higher than the liquid suspension discharging end 24, permitting gravity to assist in moving the liquid suspension therethrough.

The liquid suspension decontaminating cell 12 can be constructed of a variety of materials, such as metal, hard plastic or fiber reinforced plastic, for example. At least a portion of the cell 12 can be transparent and/or may be opened for ready inspection and maintenance. The liquid suspension decontaminating chamber 20 is preferably cylindrical as shown, however, a variety of shapes will also perform satisfactorily. The chamber has a first cross section area taken along line b—b, through which a laminar flow of liquid suspension travels. Preferably, the ratio of the length of the cell 12 to the area of the cross section b—b of the chamber is about 4:1.

The invention also provides an enclosed light contaminate collection hood 30 formed within an upper portion of the decontaminating chamber 20. The light contaminate collection hood 30 can also extend from a slot in the upper exterior surface 14 of the decontaminating cell 12, in fluid communication with the liquid suspension decontaminating chamber 20. The hood 30 has an upper port 32 for purging light contaminates 26 therethrough. The upper port 32 can permit intermittent or continuous outflow or "purging" of light contaminates 26. For example, a valve 34 may be provided to control purging through the upper port 32. In addition, a vacuum means (not shown) can be provided on the upper port 32 for improving the efficiency of purging light contaminates 26, especially entrained air bubbles. In preferred embodiments, the port 32 remains open to permit the continuous removal of light contaminates 26. The port 32 can be further equipped with a light contaminate diverter (not shown), which directs waste materials away from the apparatus 10 to prevent uncontrolled spillage.

In the alternative, or in addition to, the light contaminate collection hood 30, the cell 12 can have a heavy contaminate collection trough 40 on a lower exterior surface 14. The collection trough 40 is in fluid communication with the liquid suspension decontamination chamber 20, and has a lower port 42 and means for selectively purging heavy contaminates 28 therethrough. The lower port 42 can permit intermittent or continuous purging of heavy contaminates 28. For example, a valve 44 may be provided to control purging through the lower port 42. In preferred embodiments, the lower port 42 is intermittently open to permit the removal of heavy contaminates 28. The port 42 can be further equipped with a heavy contaminate diverter (not shown), which directs waste materials away from the apparatus 10 to prevent uncontrolled spillage.

The invention provides a means for creating a liquid suspension head for purging contaminates from the cell 12. By "liquid suspension head" is meant the hydraulic energy of the liquid suspension within the apparatus 10, in the form of static pressure head or velocity head. The liquid suspension head means can be gravity or a pump, such that the liquid suspension is provided under head to the cell 12.

The liquid suspension is preferably provided under head to the receiving end 22 of the decontaminating chamber 20 in a turbulent flow (illustrated by swirling dashed lines). The turbulent flow of liquid suspension is believed to inhibit flocking, or clumping, of the liquid suspension material of interest and contaminates. Flocking is caused by attraction of oppositely charged materials, which undesirably inhibits the removal of contaminates. The turbulent flow of liquid suspension at the receiving end 22 is in contrast to a laminar flow (illustrated by straight dashed lines) of liquid suspension towards the discharging end 24 of the chamber 20. As liquid suspension moves through the chamber 20 it becomes less turbulent and more laminar throughout a transitional flow region. The transitional flow region occurs between the liquid suspension receiving end 22 and the liquid suspension discharging end 24 of the chamber 20 and is therefore at least partially adjacent to a portion of the light contaminate collection hood 30 and/or the heavy contaminate collection trough 40. While not wishing to be bound by theory, it is believed that the contaminates rise and fall based on specific gravity most readily in the transitional flow region. Light contaminates 26 for example, may rise directly into the collection hood 30, or may rise to the upper interior surface 16 of the chamber 20 and move therealong and then into the collection hood 30.

The cell 12 can be preferably provided with an inlet tube 50 in fluid communication with the liquid suspension decontaminating chamber 20 at the receiving end 22 of the cell 12. The inlet tube 50 has a cross section area taken along line c—c, which is less than the cross section area at b—b of the chamber 20 to assist in creating turbulent flow in the decontaminating chamber 20 adjacent the collection hood 30 and/or collection trough 40. The turbulent flows circulate the contaminates upon entering the chamber, inhibiting flocking of the liquid suspension. Thereafter, in the transitional flow region, light contaminates 26 can more efficiently rise to the upper collection hood 30 and/or heavy contaminates 28 can settle in the lower collection trough. Preferably, the ratio of the cross section area at b—b of the decontaminating chamber 20 to the cross section area at c—c of the inlet tube 50 is about 4:1. Preferably, the ratio of the length of the inlet tube 50 to the cross section area at c—c of the inlet tube 50 is also about 4:1. The inlet tube 50 is the preferred point for controlling the rate and amount of liquid processed in the decontamination chamber 20. Therefore the inlet tube 50 can be provided with an adjustable flow valve.

The cell 12 can be preferably provided with an outlet tube 54 in fluid communication with the liquid suspension decontaminating chamber 20 at the discharging end 24 of the cell 12. The outlet tube 54 can have a cross section area taken along line d—d, which is less than the cross section area at b—b of the chamber 20. This is believed to assist in creating a laminar flow in the discharging end 24 of the decontaminating chamber 20. Preferably, the outlet tube 54 has a cross section area taken along line d—d, which is less than the cross section area at c—c of the inlet tube 50. The outlet tube 54 can be provided with an adjustable flow valve.

Preferably, the discharging end 24 of the chamber 20 provides a planar rather than tapered conical transition to the outlet tube 54 to avoid vortexing of the liquid suspension. Preferably, the ratio of the cross section area at b—b of the decontaminating chamber 20 to the cross section at d—d of the outlet tube 54 is about 5:1. As shown in FIG. 2, the outlet tube 54 can also extend upwards for a predetermined length in order to reduce the velocity of the decontaminated liquid suspension and to reintroduce turbulent flows in the decontaminated liquid suspension.

The interior surfaces of the apparatus 10 are preferably smooth to reduce flocking of materials on the sides thereof. Such surfaces can be prepared using cotton ball finishes, polymer coatings, electric polishings, or acid treatment followed by application of an electrical charge. A suitably smooth surface finish is also created when the apparatus 10 is constructed of fiber reinforced plastic, such as fiberglass with an epoxy coating.

The contaminate rise and/or fall rate can vary, usually between about 3 to 6 mm/sec, depending upon the particular composition of the liquid suspension. Therefore, in preferred embodiments, the rate of liquid suspension flow through the chamber can be adjusted to lengthen or shorten the duration of the decontamination procedure. In preferred embodiments, the apparatus 10 may be provided with a means for raising or lowering the discharging end 24 of the cell 12 relative to the receiving end 22 for adjusting the decline of the cell. In larger embodiments, the angle may be adjusted using a hydraulic or mechanical screw jack.

As shown in FIG. 2, one means for raising or lowering the discharging end 24 of the cell 12 relative to the receiving end 22 may be an arm 60 pivotally attached to the exterior surface 14 of the cell 12. The lowering/raising means permits the selective adjustment of the static head, and thus the liquid suspension flow rate, by controlling the decline angle of the chamber 20. Therefore, a lesser decline angle results in a longer liquid suspension retention time in the chamber 20 and increased liquid suspension decontamination, whereas a steeper decline passes liquid suspension therethrough more quickly and removes fewer contaminates. Increased angle has been shown to separate ink-laden paper fibers from non-ink-laden paper fibers, and allows the recovery of the more desirable non-ink-laden fibers from the outlet tube 54. Less angle has been shown to permit the passage of a greater proportion of small bubbles to the outlet tube 54, which may be useful for removing more ink particles, as discussed more below in Example 3. Less angle may also be useful in removing an increased amounts of clay from a liquid suspension. Therefore, the type of contaminates in a particular liquid suspension will determine the optimum angle in each case. In preferred embodiments, the decline angle is between about 10 to 80 degrees with respect to the horizon. In another preferred embodiment, particularly when air is a primary contaminate, the decline angle is between about 40 to 80 degrees with respect to the horizon. When the liquid suspension is aqueous paper pulp, a preferred angle is between 25 and 50 degrees with respect to the horizon.

Figure 3:
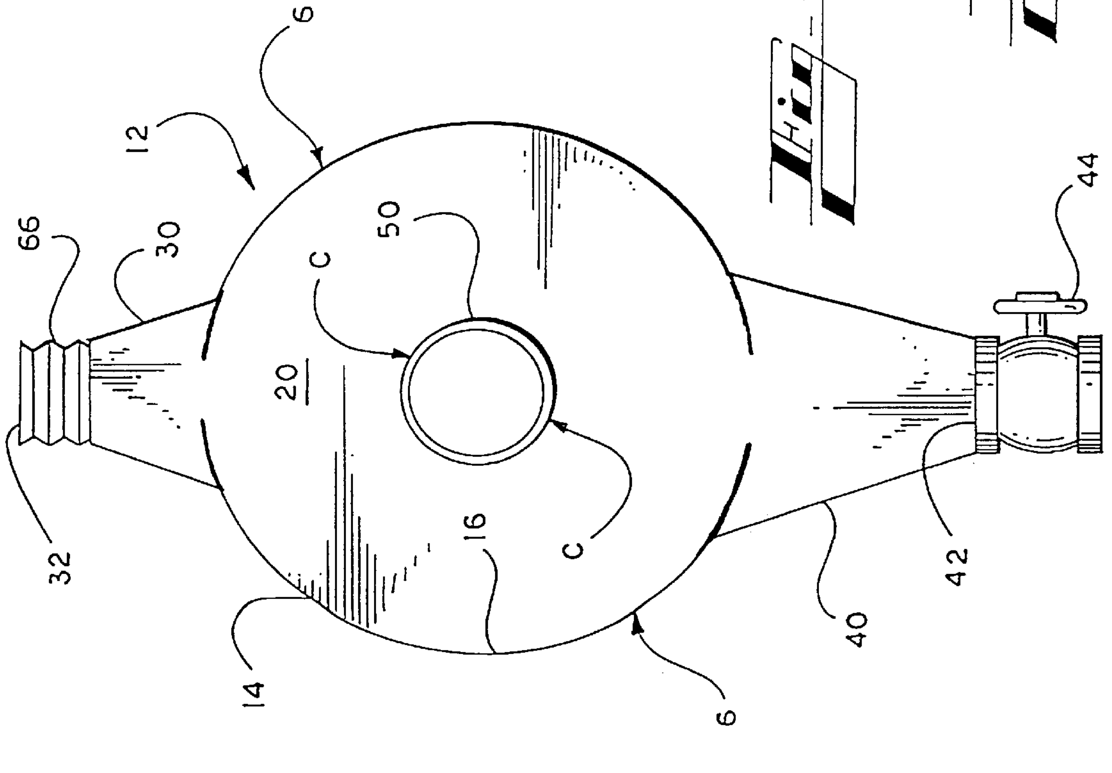
FIG. 3 is a front end view of the cell of FIG. 1.

In an alternate embodiment of the invention, the light contaminate collection hood 30 is flexibly expandable, such as provided by a bellows 66, seen in FIGS. 2 and 3. Thus, the upper port 32 of the collection hood 30 can be maintained at approximately a constant level relative to the receiving end 22 of the cell 12 throughout a range of adjustments. This configuration is believed to assist in ensuring that adequate liquid suspension pressure head is maintained at the upper port 32 to permit the light contaminates 26 to be self-purged through the upper port 32 throughout a range of adjustments. Purged light contaminates 26 and/or heavy contaminates 28 can be collected by waste hoses or diverters (not shown) in fluid communication with the ports 32, 42 and routed for disposal.

It should be understood that the apparatus 10 can be composed of a plurality of liquid suspension decontaminating cells 12. A server tray 70 can be provided in fluid communication with the liquid suspension receiving end 22 of each cell 12 decontaminating chamber 20. The server tray 70 provides liquid suspension under head to each cell 12, either by gravity or a pump. In one embodiment, the tray 70 has a top end 72 and a converging narrower bottom end 74 for maintaining head as liquid suspension is siphoned off to upper cells 12.

The apparatus 10 can be further equipped with a plurality of liquid suspension agitating members 76, or dams, on the server tray 70 for inhibiting flocking and maintaining liquid suspension consistency prior to decontamination. The liquid suspension agitating members 76 rise from the inside surface 75 of the tray 70 to a height less than the side walls 77, 78 of the tray 70. Thus, as liquid suspension flows across the tray 70, liquid suspension spills over each succeeding agitating member 76, rather than over the side walls 77, 78 of the tray 70.

Figure 5:
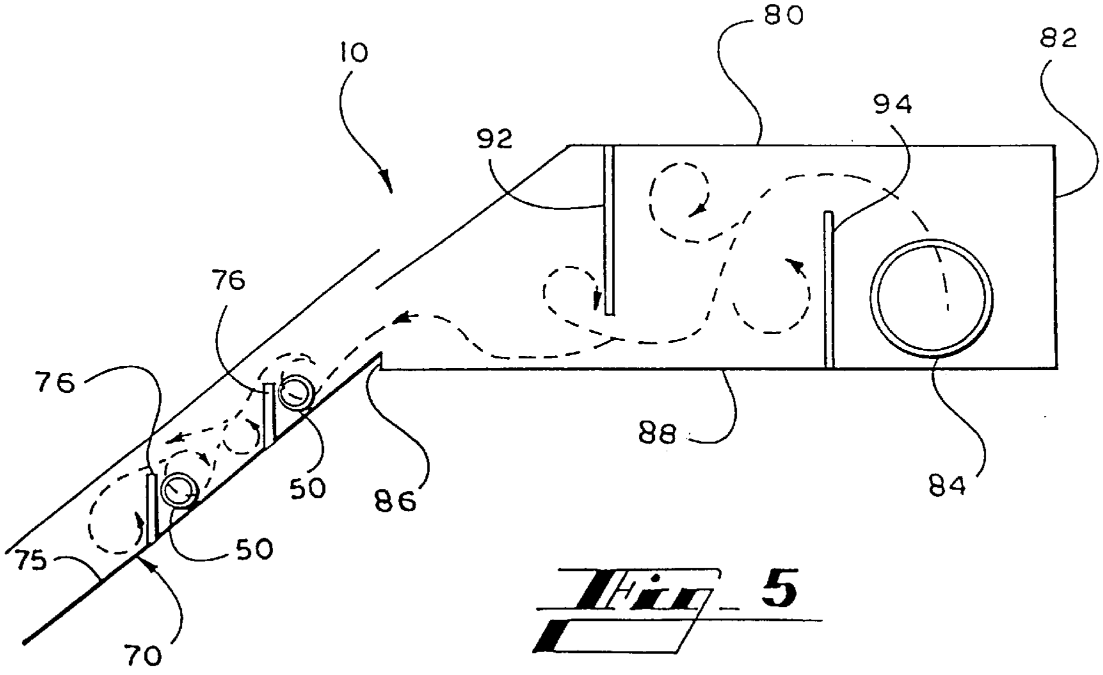
FIG. 5 is a cross-section view of a head box and server tray according to the present invention, detailing several liquid suspension agitating members therein.

As shown in FIG. 5, the liquid suspension agitating members 76 can also extend to a predetermined height above the upper port 32 to ensure that a constant liquid suspension head is maintained for purging light contaminates 26. Liquid suspension agitating members 76 should be lower than the upper port 32 for removing foam contaminates, and equal to or higher for removing certain desirable solids. Agitating member 76 lengths are dependent upon achieving an acceptable reject material. When the light contaminate collection hood 30 is provided with a bellows 66, and a means for adjusting the decline of the cell 12, the agitating member 76 preferably remains at a higher relative level than the upper port 32 to maintain a purging head throughout a range of adjustments.

Figure 4:
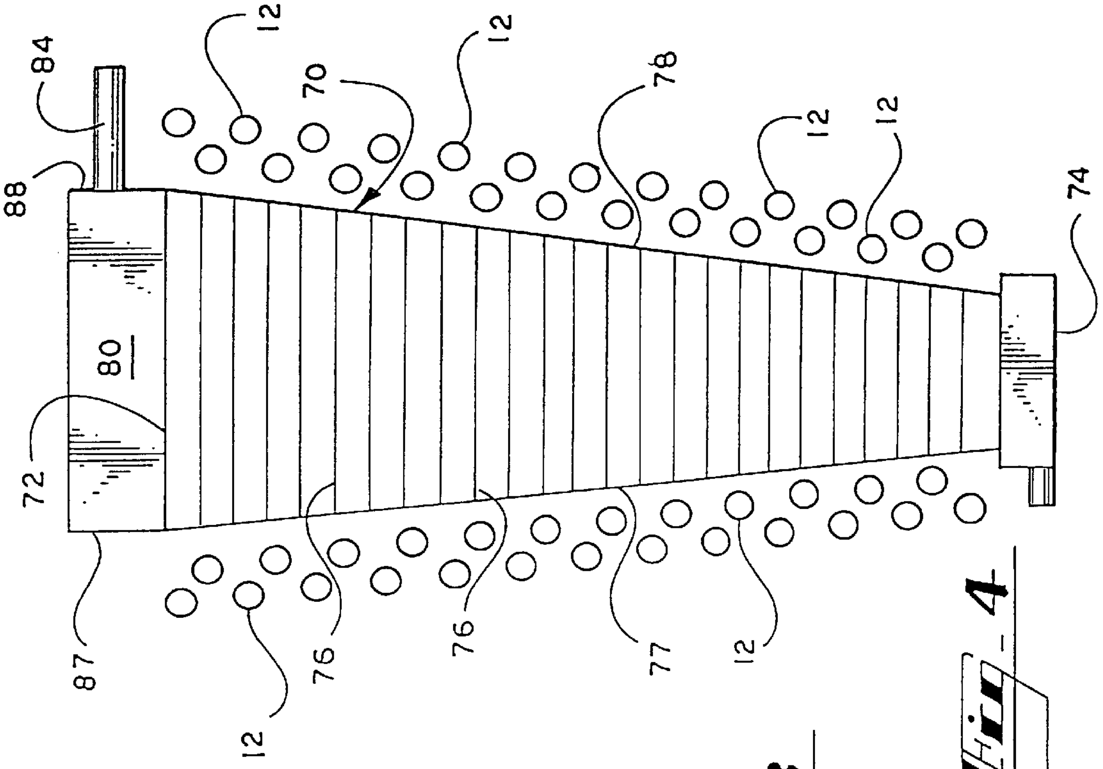
FIG. 4 is a schematic front view of a server tray according to the present invention for providing a liquid suspension to a plurality of decontaminating cells.

As seen in FIG. 4, a single tray 70 can serve about fifty cells 12 to achieve an increased economy of scale. The longitudinal axis alone of each cell 12 extends approximately perpendicularly from the plane of the tray 70. The cells 12 can be spaced in a staggered fashion in order to maximize their number. In still more preferred embodiments, multiple levels of trays 70 may be provided in a stacked configuration. For example, in one embodiment of the invention, 6 stacked trays 70 can be provided, utilizing a total of 300 such cells 12.

As seen in FIG. 5, the server tray 70 itself can be supplied by a liquid suspension) line 84 and head box 80. Alternatively, the head box 80 can directly supply one or more decontamination chambers via respective inlet tubes. The head box 80 has a liquid suspension supply end 82 adjacent the liquid suspension line 84, and a liquid suspension flow end 86, connected by opposed sidewalls 87, 88. When the liquid suspension head is created by means of gravity, the liquid suspension box 80 should be located above the server tray 70 and cells 12, as shown. The head box 80 can also be equipped with upper and lower agitating members 92, 94 therein to maintain an even liquid suspension consistency prior to decontamination. In one preferred embodiment, the head box 80 is about 5 feet wide, and has side walls 92, 94 extending about 2 to 3 feet in length and about 8 inches tall. The liquid suspension supply line 84 can have a diameter of about 4 inches and the liquid suspension flow end 86 adjacent the top end 72 of the server tray 70 can have a slotted opening about 5 feet wide and 2½ inches high.

Figure 6A:
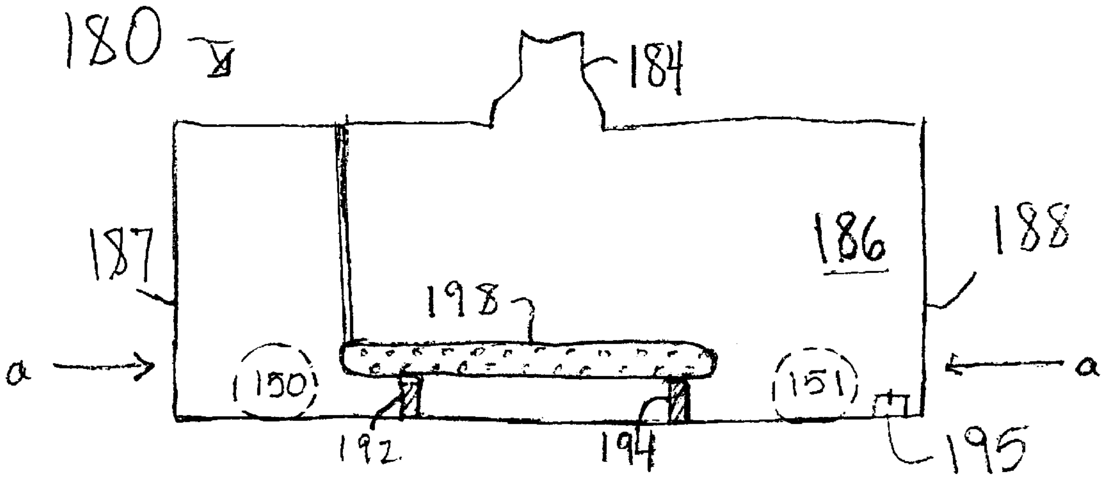
FIG. 6A is a cross-section side view and FIG. 6B is a cross-section overhead view of an alternative head box according to the present invention, detailing several liquid suspension agitating members and an air supply line therein.
Figure 6B:
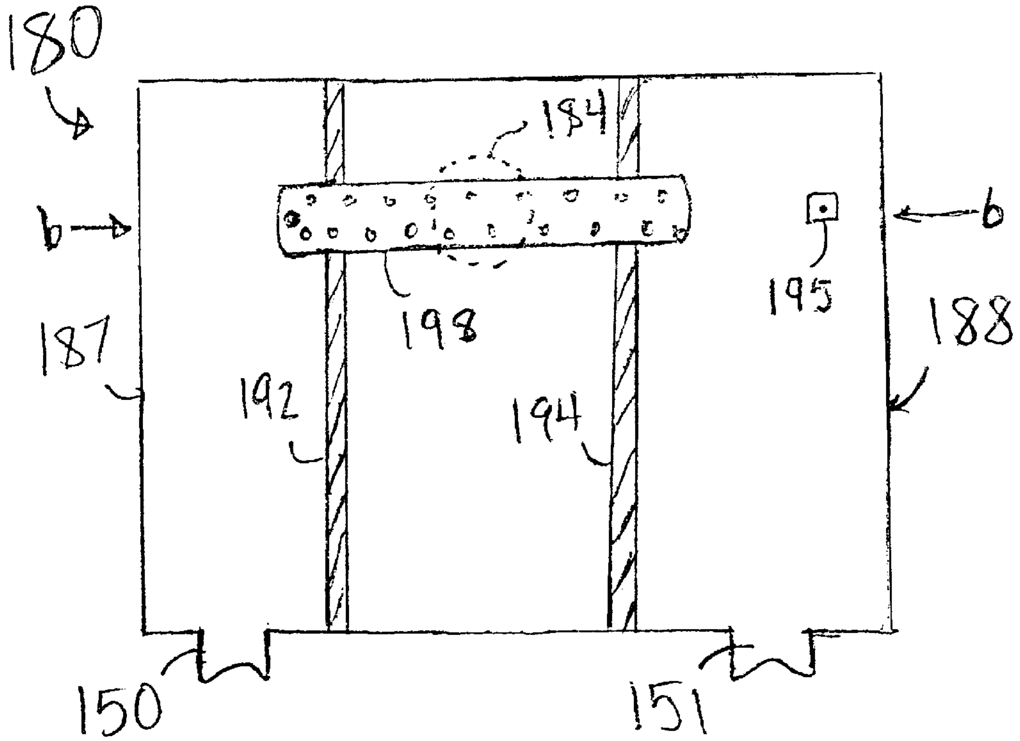

FIGS. 6A is a cross-section side view along b—b and FIG. 6B is a cross-section overhead view along a—a of an alternative head box 180 according to the present invention. As shown, the head box 180 can be provided with a single overhead liquid suspension supply line 184, a liquid suspension flow end 186, and opposed sidewalls 187, 188. It should be understood, however, that the liquid suspension can be supplied to the head box 180 from any point. The liquid suspension exits the head box 180 through the flow end 186 by means of two decontamination chamber inlet tubes 150, 151. Any number of exits may be provided, depending upon the number of decontamination apparati being fed, or the particular use contemplated.

The head box 180 can also be equipped with lower agitating members 192, 194 therein to cause the suspension to flow thereover and incorporate more air into the liquid suspension, and to maintain an even liquid suspension consistency prior to decontamination. In one preferred embodiment, the head box 80 is about 5 feet wide, and has side walls 92, 94 extending about 2 to 3 feet in length and about 18 inches tall. The liquid suspension supply line 82 can have a diameter of about 6 inches and the two decontamination chamber inlet tubes 150, 151 can each have a diameter of about 8 inches. In general, the liquid suspension supply line 82 diameter is dependent upon the flow requirements of each situation.

An adjustable control valve (not shown) may be located upstream of the head box 80 or 180 and/or a liquid level sensor 195 can be located within the head box 180 for maintaining the optimum head box liquid level, depending upon the type of suspension and contaminates being removed. Such a liquid level sensor 195 can be a diaphragm differential pressure transmitter with the low pressure port open to atmosphere. In a preferred embodiment of FIGS. 6A and 6B, when decontaminating recycled paper pulp, the head box liquid level should be maintained approximately 13 inches below the foam reject elevation. This provides sufficient foam dwell time in the upper light contaminate collection hood 30 for concentrating ink contaminates and reducing the solids and liquid losses out of the rejects port 32.

FIGS. 6A and 6B show an air supply conduit 198 located within the head box 180 below the liquid level. Air, or other effective gases, can thereby be pumped from an outside source and efficiently infused into the contaminated liquid in the head box 180 before entering the decontamination chamber. The air supply conduit 198 is shown as a pipe perforated along the length thereof with small holes to form gas bubbles within the liquid suspension. The size of the holes can preferably be about 1/32 to 1/2 inch, or more preferably about 1/16 inch in diameter. Many configurations of an air supply conduit 198 can be effective in assisting in the removal of light contaminates from the solution. For example, air can be injected at any point upstream of the decontamination chamber, or directly through one or more ports into the head box. The quantity of air is preferably about 0.1 to 15%, more preferably about 1% to 10%, and more preferably about 1% by volume of the total solids entering the head box, wherein solids are fibers and contaminates, but not the suspending liquid. However, the optimum volume of air is dependent upon the quantity and type of dispersed contaminates available to be removed from the suspension, which will vary depending upon the sample, and is readily determinable.

As described below in Examples 2 through 4, air infused into the liquid suspension prior to delivery into the decontamination chamber provides an additional, very effective means for carrying light contaminates to the upper collection hood. In the case of recycled pulp slurries, the air bubbles cause a shearing force that assists in the removal of ink particles from the paper fibers. The result is a greater removal of ink particles from the solution, and a greater retention rate of fibers. Larger holes in the conduit 198 permit larger bubbles, and therefore, more surface area for the ink particles to adhere to, however, this advantage must be balanced against the relative instability of larger bubbles. Smaller bubbles tend to be carried through the decontamination chamber more readily than larger bubbles. In the case of decontaminating recycled paper, bubbles in the size range of about 0.0025 to about 2.5 mm are preferred. The optimum size of the bubbles and the rate of the gas infusion into the liquid suspension will vary depending upon the type of fluid and contaminates in the system.

The invention also provides that the removal of contaminates can be significantly facilitated by the use of a mechanical agitating device in the liquid suspension prior to transfer to the head box. By "mechanically agitating" as used herein is meant the vigorous blending of the suspension with a device having moving parts. Such a mechanical agitating device is to be distinguished from stationary agitating members, such as described above, having no moving parts. An example of a particularly effective mechanical agitating device is a commonly available industrial chemical mixer device. A chemical mixer, such as commercially available from Bematek (Beverly, Mass.) or Ahlstrom Almix (Atlanta, Ga.), can be used with beneficial results, such as demonstrated below in Example 4. Such a chemical mixer typically has three prongs which rotate within the suspension at about 1,800 rpm. Either all or a portion of the liquid suspension can be directed through the chemical mixer, or similar agitating device, to facilitate even distribution of the materials, to provide shearing forces, and to generate air bubbles therein, prior to directing the suspension to the decontaminating cell. The mechanical agitation of the mixer provides a surprising improvement in the subsequent removal of contaminates from the suspension in the decontamination chamber.

The invention also provides that the liquid suspension can be mechanically agitated with an emulsifying device, available from Bematek (Beverly, Mass.). Such a device can also introduce air bubbles with a controlled size into the liquid suspension. The resulting emulsion can then be directed to the decontamination chamber, or additionally first through a chemical mixer, where the emulsion is ultimately decontaminated. This method produces an emulsion and mixes the air bubbles with the paper stock slurry in a preferred manner. The invention contemplates that air may be infused into the liquid suspension before or during treatment with an agitating chemical mixer or emulsifying device.

The invention contemplates that the angle control means, the air supply inlet and the adjustable flow control valves upstream and downstream of the decontamination chamber can be electronically controlled in coordination with flow sensors and the head box liquid level sensor to optimize the decontamination process, depending upon the type of suspension and contaminates therein. Sensors determining the amount of contaminates removed, such as ink, or brightness of the resulting decontaminated suspension can also be used to adjust the variable parameters of the apparatus. These parameters can be monitored and periodically adjusted by a computer to automatically maintain optimum decontaminating performance.

The invention also provides a method of decontaminating a liquid suspension, utilizing the above described apparatus 10, comprising the step of first providing a turbulent flow of liquid suspension to an elongated cell 12 having an exterior surface 14, an interior surface 16 defining a liquid suspension decontaminating chamber 20 having a given diameter, a liquid suspension receiving end 22, and a liquid suspension discharging end 24. Then, purging light contaminates 26 from an enclosed light contaminate collection hood 30 within an upper portion of the liquid suspension decontamination chamber 20, through an upper port 32 by a means for selectively purging the light contaminates 26 therethrough. The means for selectively purging the light contaminates 26 can be gravity or a pump. The upper port 32 is disposed such that light contaminates 26 are purged therethrough by a liquid suspension head. Finally, the method comprises collecting decontaminated liquid suspension from the discharging end 24 of the chamber 20 for further use.

In preferred methods, the light contaminates 26 are purged continuously through the upper port 32, but can alternatively be purged at selected intervals through the upper port 32. In preferred embodiments, the method further comprises creating a liquid suspension flow gradient in the decontaminating chamber 20 between turbulent flows adjacent the receiving end 22 and laminar flows adjacent the discharging end 24, such that a transitional decontaminating flow region is created adjacent the collection hood 30 and/or the collection trough 40. The invention also provides a decontaminated liquid suspension product made by the above process.

The invention also provides methods of decontamination using various chemical additives to the liquid suspension at any point in the process prior to entry into the decontamination chamber. The invention provides emulsifying agents, surfactants, collector chemicals, alkaline agents, carrier particles and dispersion particles that can be combined with the liquid suspension slurry to facilitate the removal of contaminates within the decontamination chamber. Such particles are provided with a preselected size and specific gravity, and optionally an electrical charge. Additional features may be preselected for the carrier particles, such as by construction techniques and fabrication processes that provide further advantages in contaminate removal.

Carrier particles having a specific gravity of less than the liquid suspension slurry, e.g. about 0.5, can facilitate removal of light liquid suspension contaminants by physically uplifting a light contaminate through the liquid suspension, or by providing holes through a mat of materials in the liquid suspension for contaminates to more readily pass through. The light contaminates and light carrier particles can then be continuously or intermittently removed from the light collection hood, as described above.

Carrier particles having a specific gravity of greater than the liquid suspension, e.g. about 1.5, can facilitate removal of heavy contaminants by physically carrying a heavy contaminate through a liquid suspension, or by providing holes through a mat of particles in the liquid suspension for contaminates to more readily pass through. The heavy contaminates and heavy carrier particles can then be intermittently removed from the heavy contaminate collection trough, as described above.

The physical nature of the carrier is preferably a particle of between approximately 10 to 500 microns in diameter. This carrier particle preferably has a surface area that allows many microscopic and sub-microscopic contaminant particles to become attached thereto. Preparation of the carrier determines the preselected specific gravity. Many materials can be selected to be used in the carrier's construction, such as paper fiber, cotton, sand, kaolin clay, iron oxides, aluminum oxides, silicone and silicon oxides, wood, glass, acrylics, hydrous resins, resins, polystyrene, polyvinyl chloride, synthetic fibers, or combinations of any of these materials.

A particular advantage of adding carrier particles having a specific gravity less than the liquid suspension is the ability to remove light contaminates such as plastic. This continuous uplift of carrier particles entering the decontamination chamber physically catches large pieces of plastic contaminants and lifts them up through the liquid suspension. Otherwise, the particles may be trapped in the liquid suspension and not as efficiently separated by specific gravity, because of the retardation effect from the liquid suspension.

Adding a combination of both light and heavy specific gravity carrier particles to the same process stream of liquid suspension will provide holes for contaminates trapped in the liquid suspension to travel simultaneously down and up in the same decontamination device. The effect is to break any fiber mat into holes going upward and downward.

Another feature of the invention is to provide a surface charge on the carrier particles to attract oppositely charged contaminate particles. In this embodiment, the carrier particles can selectively locate and isolate known liquid suspension contaminants by attachment to the carrier particle using charge attraction. Carrier particle surface charge is controlled through a preparation process before being introduced into the process stream. The charge can, therefore, be positive or negative, dependent on the carrier preparation. Surface charge on the particles can be achieved through a variety of means, including exposure of the particles to an electronic current, or attachment of previously charged molecules thereto.

For example, polar fatty acid moieties may be attached to the surface of the carrier particles. In particular, positively charged carrier particles can be used to facilitate the removal of ink particles, which can be negatively charged, from paper pulp. An example of a carrier particle for removing light contaminates from a clay suspension is a charged fatty acid, such as oleate.

An additional feature of the invention is to provide an adhesive surface treatment on the carrier particles to bind to contaminate particles. In this embodiment, the carrier particles can isolate known liquid suspension contaminants by attachment to the carrier particle using the adhesive property of the coating. Carrier particle surface treatment can be controlled through a preparation process before being introduced into the process stream. For example, various synthetic or natural resins having water-resistant properties can be used to adhere to and remove contaminates. The invention contemplates that carrier particles may be reused as desired and provided with alternative coatings to facilitate the removal of different contaminates.

The invention provides that additional dispersing carrier particles can be added to the suspension prior to separation to prevent agglomeration of materials in the liquid, such as ink. Examples of such particularly useful dispersing particles include positively or negatively charged inorganic salts, like tetrasodium pyrophosphate, sodium tripolyphosphate, and hexametaphosphate. Examples of other particularly useful dispersing particles include positively or negatively charged organic materials, like anionic polyacrylamide, polyacrylic acid, and many well-known surfactants. Example 2 demonstrates the useful nature of such dispersant particles when used in the present invention. Such charged dispersant particles can also increase foaming, and hence, separation of contaminates in the liquid suspension. The dispersing particles also serve to keep the ink particles small, as very small particles of hydrophobic ink can more easily be attached to the surface of a hydrophobic air bubble. This is in contrast to conventional air flotation de-inking systems where the ink particles are flocculated together into large ink particles, which are then only attracted to the surface of much larger air bubbles. The anionic dispersing particles are soluble in water and disassociate into charged ionic compounds. Therefore, particles size is very difficult to determine.

Therefore, the invention provides a method for decontaminating a liquid suspension by infusing a gas into a contaminated liquid suspension prior to directing the suspension through a decontamination chamber as described. The gas is preferably air, and can be infused under pressure at a volume rate of approximately 0.1 to 10 percent, and preferably about 1 to 2 percent, of the total volume of the liquid. Furthermore, the invention provides a method for decontaminating a liquid suspension by infusing a dispersing particle into a contaminated liquid suspension prior to directing the suspension through a decontamination chamber as described. An advantage of this system is to provide a method for separating small contaminates that may not be removed as efficiently from the liquid suspension stream using traditional flocculating separation methods.

EXAMPLE 1

An apparatus for decontaminating a liquid suspension is constructed which has two elongated, cylindrical cells, each about 34 inches in diameter and 14 feet in length. The cells each have an exterior surface and an interior surface defining a liquid suspension decontaminating chamber. The apparatus also provides an enclosed light contaminate collection hood on the upper exterior surface of the decontaminating cell, which is in fluid communication with the liquid suspension chamber. The hood has an upper port for continuously purging light contaminates therethrough.

The cell also has a heavy contaminate collection trough on the lower exterior surface. The collection trough is in fluid communication with the liquid suspension chamber, and has a lower port and a valve for selectively purging heavy contaminates therethrough.

A liquid suspension is provided to the decontaminating chambers under head from a head box from an inlet tube at the upstream liquid suspension receiving end, and permitted to flow downstream through the chamber under gravity to the opposite liquid suspension discharging end. A head box similar to that shown in FIGS. 6A and 6B measured 5 feet wide by 2 feet in length and 18 inches in height. The turbulent flow of liquid suspension enters the cell and becomes increasingly laminar as it travels towards the discharging end.

Figure 7:
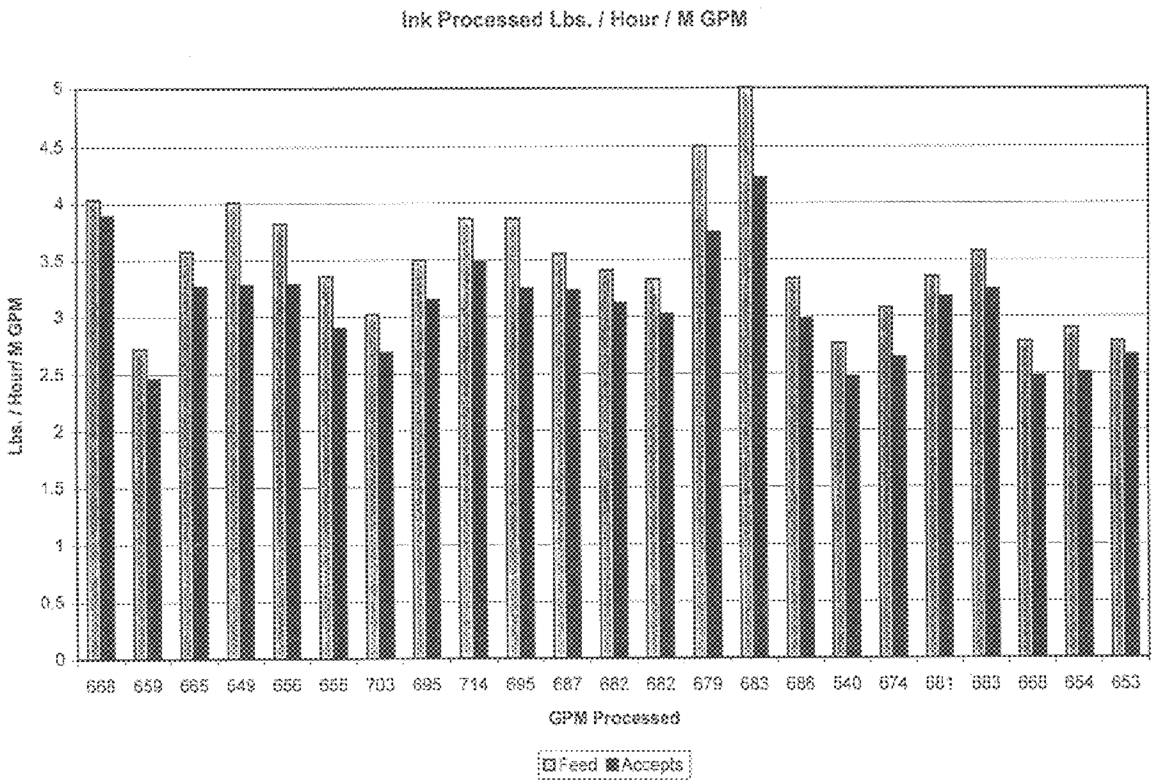
FIG. 7 is a graph showing the comparative effect on feed and accepts ink processed in pounds per minute per 1,000 gallons of paper pulp stock at various levels of pulp stock processed in gallons per minute (GPM).

FIG. 7 is a graph showing the comparative effect on feed and accepts ink processed in pounds per minute per 1,000 gallons of paper pulp stock at various levels of pulp stock processed in gallons per minute (GPM). The amount of ink processed is calculated from a measurement of the "Effective Residual Ink Concentration" (ERIC) in parts per million. A Technibrite TB-C/IR 950 ERIC tester available from Technidyne is used to measure the ERIC value. The remainder of the calculation is determined by the following formula:

ERIC/1,000,000×Feed Rate (gpm)×wt. dry solids/wt. wet solids×8.3 lbs/gallon×60 min/hour×1000 (gpm)/Feed Rate (gpm)=Ink Processed (lbs/hr/1000 gpm)

This optimum flow rate will vary according to each type of liquid suspension and the type of contaminates therein.

Figure 8:
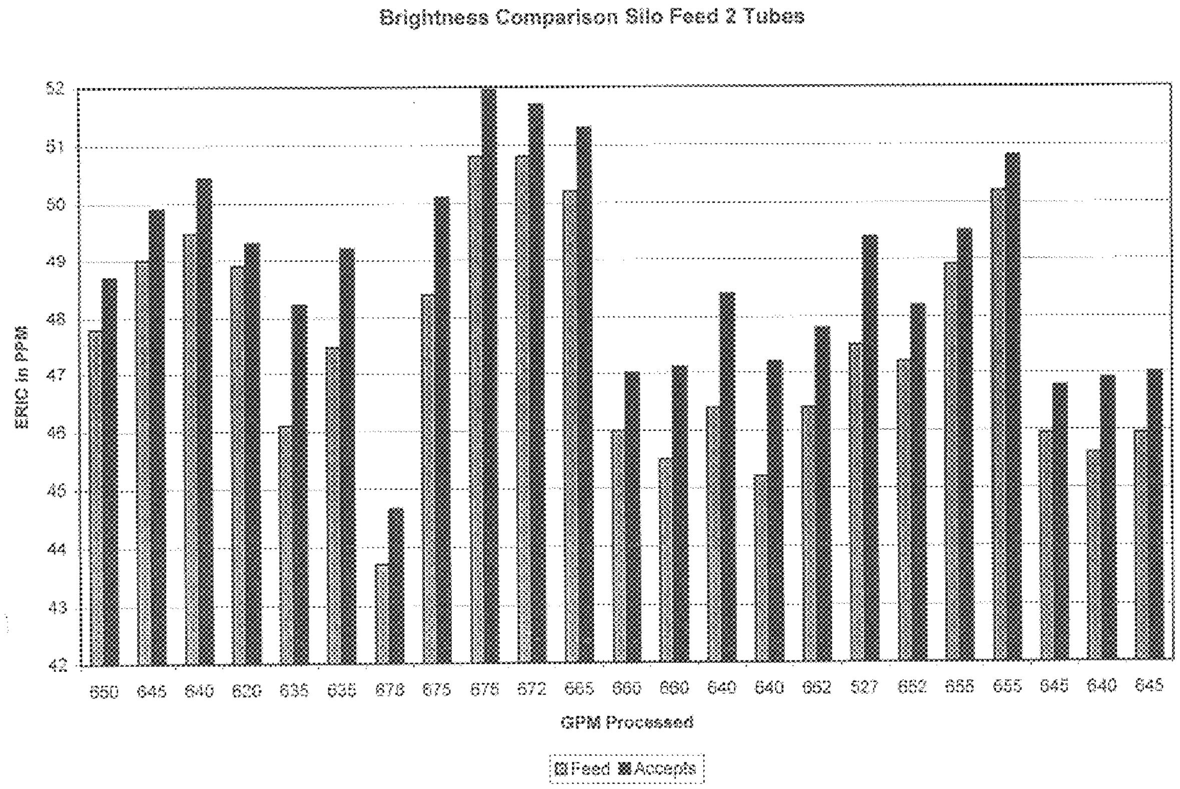
FIG. 8 is a graph showing the comparative effect on brightness of feed and accepts pulp stock at various levels of pulp stock processed in GPM.

FIG. 8 is a graph showing the comparative effect on brightness of feed and accepts pulp stock at various flow rates in gallons per minute. Brightness is determined by the Technibrite TB-C/IR 950 ERIC tester available from Technidyne. As can be seen from the graph, the flow rate has little affect on brightness gain. Stock conditions such as process additives and process conditions have a greater affect on brightness gain.

Figure 9:
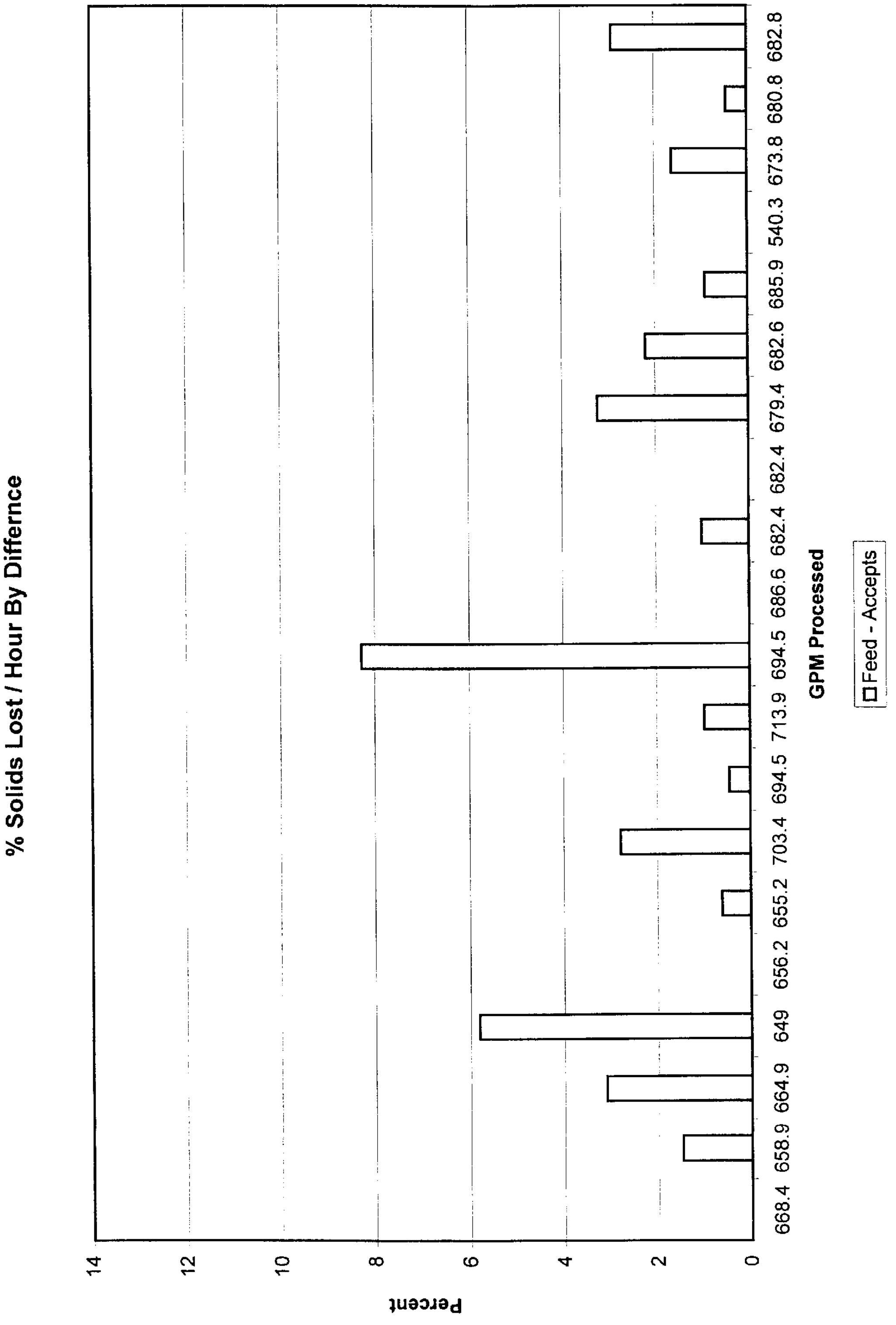
FIG. 9 is a graph showing the comparative effect on percent of solids lost per hour of paper pulp stock feed and accepts at various levels of pulp stock processed in GPM.

FIG. 9 is a graph showing the comparative effect on percent of solids lost per hour of paper pulp stock at various levels of pulp stock processed in gallons per minute. Solids losses were measured using different head box level conditions. Different solids losses were measured under these controlled conditions. Therefore, this system is unique in that traditional flotation systems usually require trial and error chemical adjustments to vary the solids losses. Depending upon the requirements or system performance expectations, a simple head box level adjustment can produce a controlled solids loss. The range of adjustment can easily be from no losses to 8.3 percent. The flow rates were not as critical in determining these results as was the head box level. The head box level conditions are not a part of this graph.

Typical flotation systems have an increasing solids loss with increasing flow rates. FIG. 7 shows a solids loss of 0.5 percent and 8.4 percent at 694.5 GPM. Increasing the flow rate to 714 GPM results in a solids loss of 1 percent. This clearly indicates that the present invention functions entirely differently from traditional flotation systems.

EXAMPLE 2

This example demonstrates the effect of introducing air and/or dispersant particles into the liquid suspension of paper pulp prior to using a decontamination apparatus as in Example 1, except with dimensions of 20 inches in diameter and 7 feet in length. A head box measured 8 inches wide by 16 inches in length and 12 inches in height. The liquid suspension supply line was 6 inches in diameter and each of two decontamination chamber inlet tubes was 8 inches in diameter. An air supply conduit was constructed in the head box directly beneath the stock feed line, having a ¾ inch diameter, about 2 feet in length and with approximately 64 holes drilled along the length thereof, each having a 1/16 inch diameter. The air flow rate was adjusted using a manual valve without a flow measuring device. The approximate air volume was in a ratio of 2 percent by volume of solids entering the head box.

Figure 10:
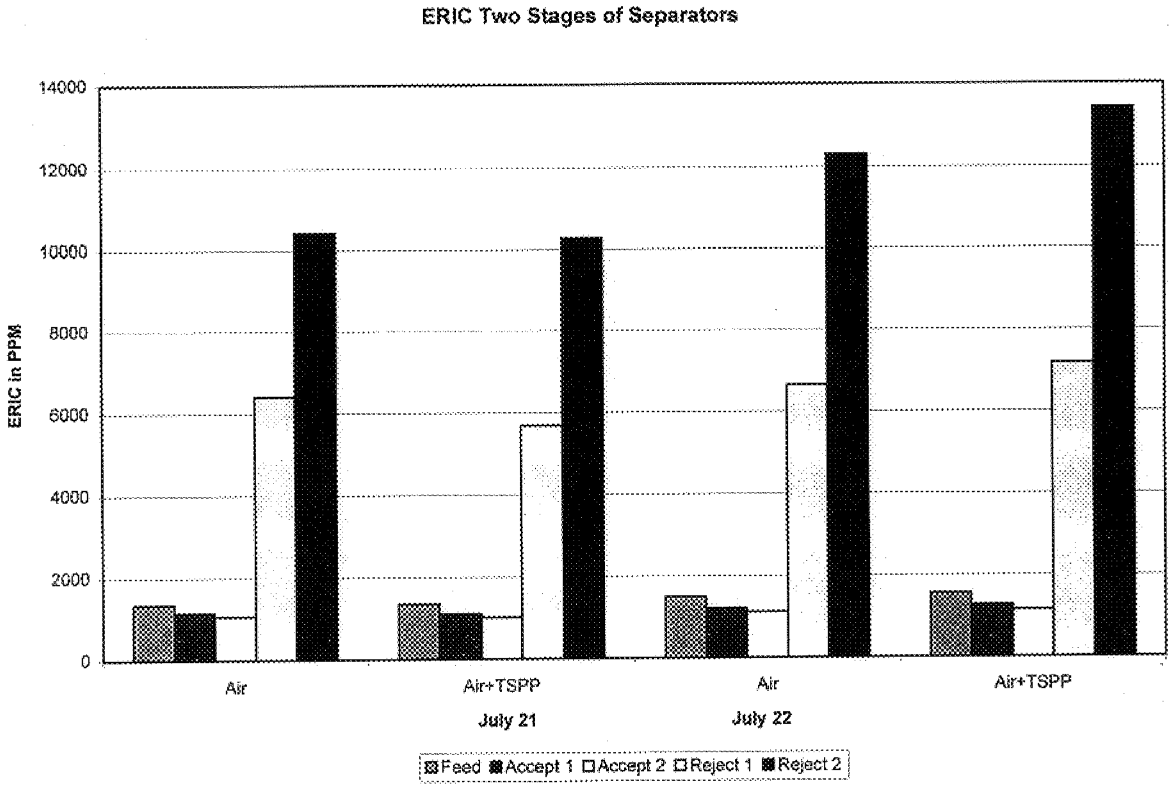
FIG. 10 is a graph showing the comparative effect on available feed, accept 1, accept 2, reject 1, and reject 2 pulp effective residual ink concentration (ERIC), measured in parts per million, under conditions with or without air and dispersant tetrasodium pyrophosphate (TSPP).

FIG. 10 is a graph showing the comparative effect on available feed, accept 1, accept 2, reject 1, and reject 2 pulp effective residual ink concentration (ERIC), measured in parts per million, under conditions with air and with or without dispersant particles of tetrasodium pyrophosphate (TSPP). The accept 2 and reject 2 pulp refer to second passes of the suspension in a series. The figure demonstrates that the introduction of dispersant particles along with air (Air+TSPP) greatly increases the residual ink in the rejects and decreases the ERIC in the accepts. The second pass performance is improved because TSPP increases the ink removal rate. As can be seen in the Figure, the rejects ink content is much higher in the second pass, indicating that TSPP and additional head box air improve performance with the same liquid suspension conditions in the first pass.

Figure 11:
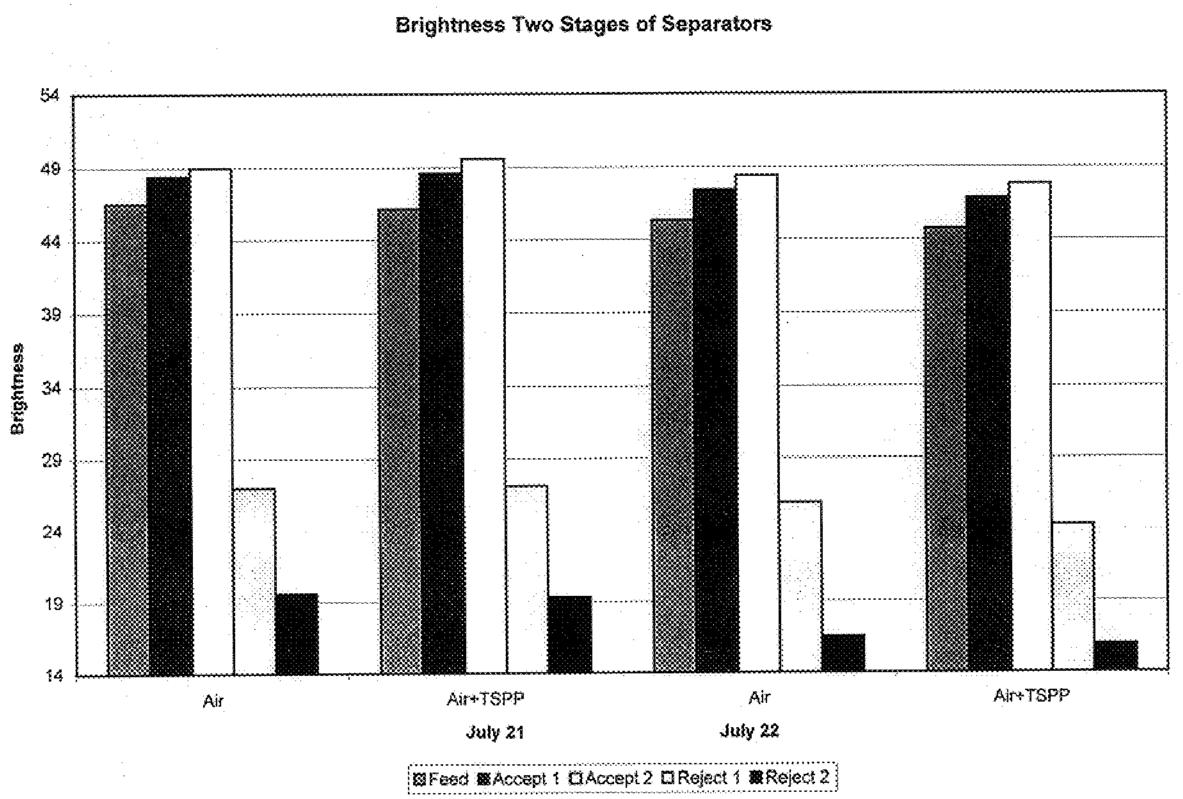
FIG. 11 is a graph showing the comparative effect on available feed, accept 1, accept 2, reject 1, and reject 2 pulp brightness under conditions with or without air and TSPP.

FIG. 11 is a graph showing the comparative effect on available feed, accept 1, accept 2, reject 1, and reject 2 pulp brightness under conditions with air and with or without TSPP. Relative to the available pulp, the lower reject brightness results from more ink being removed when both air and TSPP are present (Air+TSPP).

Figure 12:
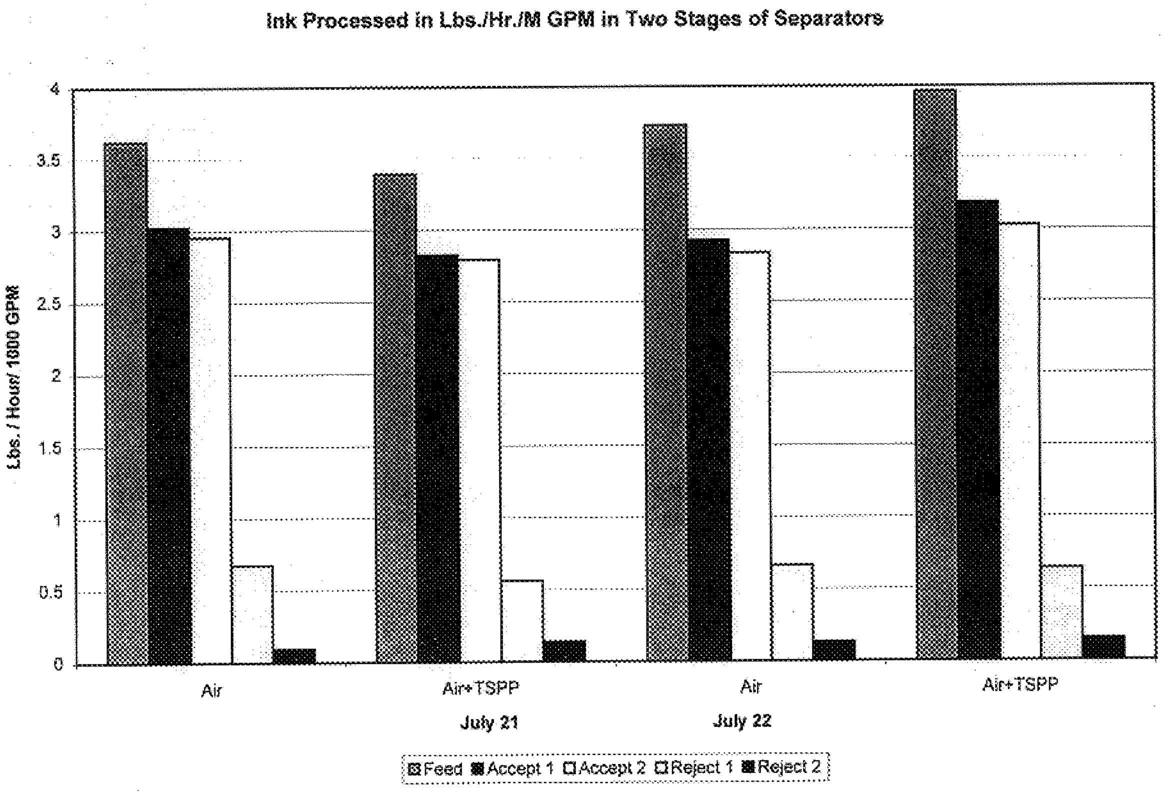
FIG. 12 is a graph showing the comparative effect on available feed, accept 1, accept 2, reject 1, and reject 2 ink processed in pounds per minute per 1,000 gallons of paper pulp stock under conditions with or without air and TSPP.

FIG. 12 is a graph showing the comparative effect on available feed, accept 1, accept 2, reject 1, and reject 2 ink processed in pounds per minute per 1,000 gallons of paper pulp stock under conditions with air and with or without TSPP. Ink processed is the amount of ink available in the feed. 1st accepts is the amount of ink available for the second pass removal. 2nd accepts is the amount of ink staying in the stock returned to the system. Rejects 1 is the amount of ink rejected in the first pass, and rejects 2 is the amount of ink rejected in the second pass. Relative to the feed pulp, the greatest increase in the amount of ink processed occurs when both air and TSPP are present (Air+TSPP).

Figure 13:
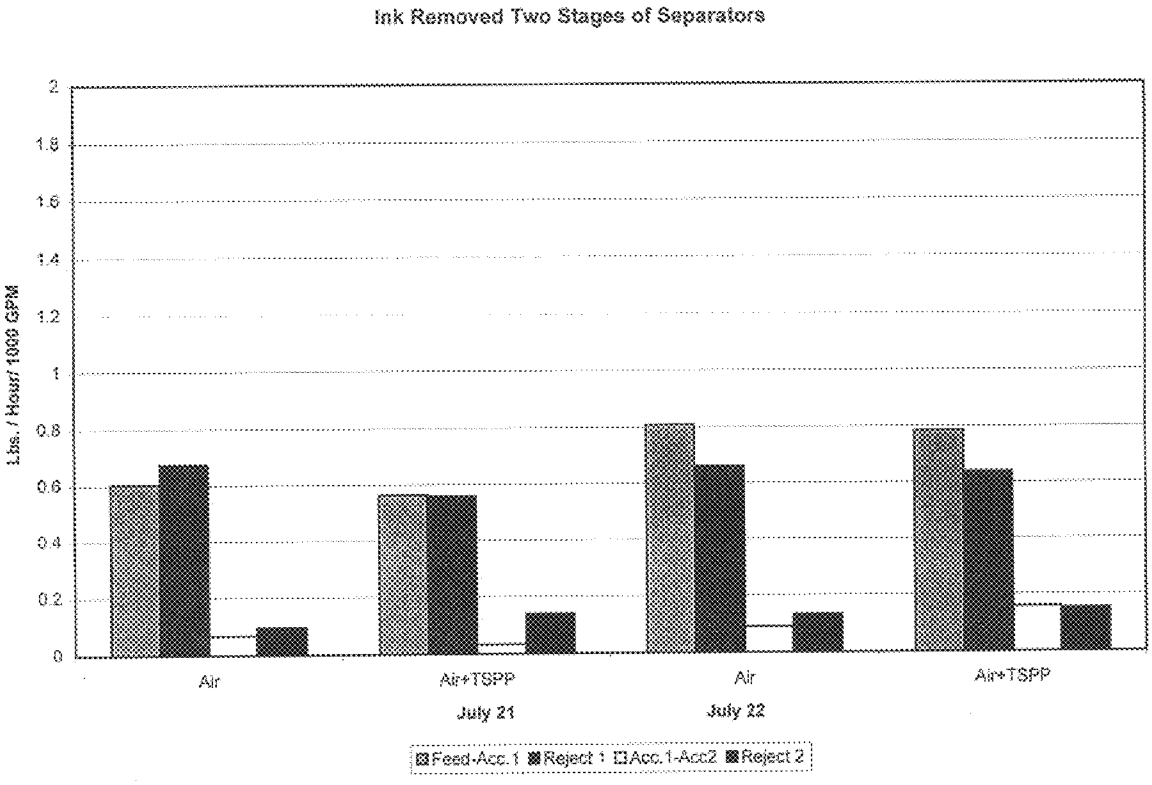
FIG. 13 is a graph showing the comparative effect on available feed minus accept 1, reject 1, accept 1 minus accept 2, and reject 2 ink removed in pounds per minute per 1,000 gallons of paper pulp stock under conditions with or without air and TSPP.

FIG. 13 is a graph showing the comparative effect on available feed minus accept 1, reject 1, accept 1 minus accept 2, and reject 2 ink removed in pounds per minute per 1,000 gallons of paper pulp stock under conditions with or without air and TSPP. Available ink or ink processed is the quantity of ink in the feed. Ink removed is the difference between the ink in the feed minus the ink in the accepts. These measurements are made because not all of the ink is removed by de-inking. Relative to the feed pulp, the greatest increase in the amount of ink processed occurs when both air and TSPP are present (Air+TSPP).

EXAMPLE 3

A decontamination apparatus and a head box as in Example 2 were used in the following example to demonstrate the effect of angle of the separation chamber on decontamination efficiency. A high angle corresponds to approximately 45 degrees relative to the horizon, and a low angle corresponds to approximately 35 degrees relative to the horizon.

Figure 14:
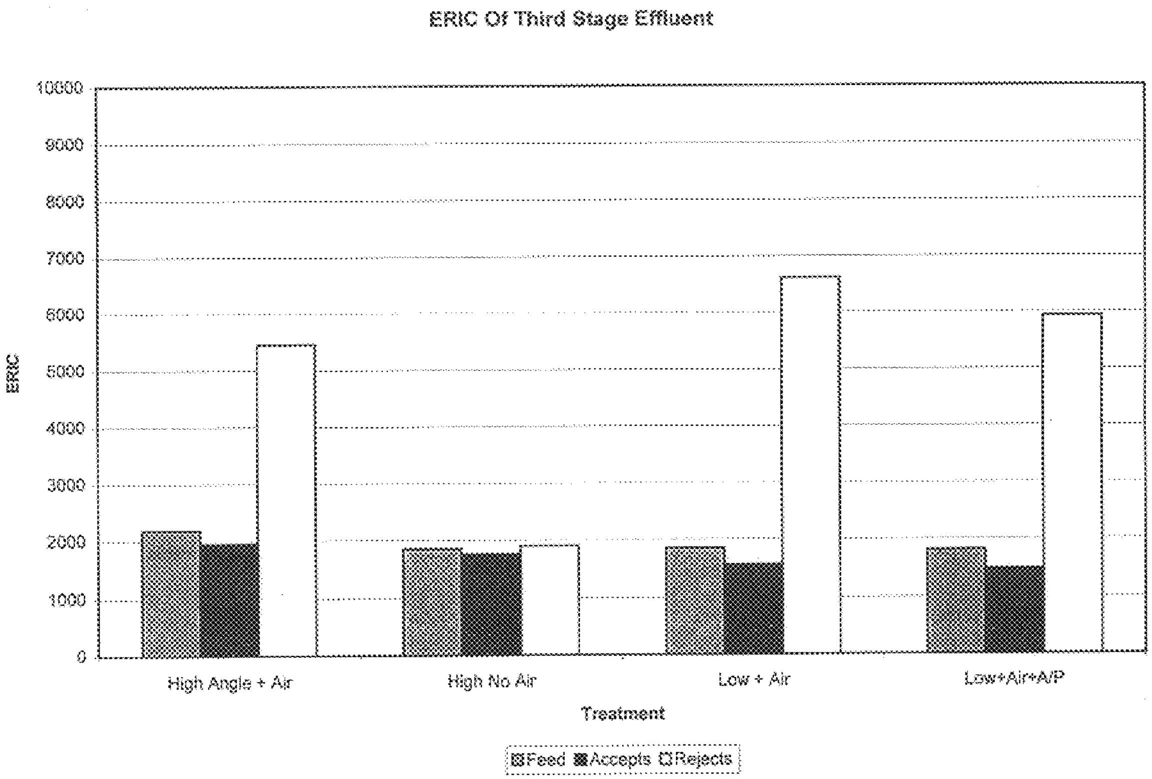
FIG. 14 is a graph showing the comparative effect on feed, accepts, and rejects pulp ERIC, measured in parts per million, under conditions with or without air, at high and low tube angles, and with alum and a flocculating polymer.

FIG. 14 is a graph showing the comparative effect on feed, accepts, and rejects pulp ERIC, measured in parts per million, under conditions with or without air, at high and low tube angles, and with alum and a flocculating polymer. The results demonstrate that the greatest change in residual ink occurs when a low angle is used with an air supply. The least favorable results occur when a high angle is used with no air supply.

EXAMPLE 4

A decontamination apparatus and a head box as in Example 2 were used in the following example to demonstrate the effect of the infusion of air into the liquid on decontamination efficiencies. Further, this example demonstrates the effect of the use of a chemical mixer on the paper pulp prior to its introduction into the head box. The chemical mixer provides two functions: emulsifying air, surfactant and water, as well as shearing physically attached ink particles off the paper fiber. In the turbulent conditions of the chemical mixer, the hydrophobic ink freed particles are brought into close proximity to the hydrophobic surface of an air bubble, and the two particle surfaces join together.

Figure 15:
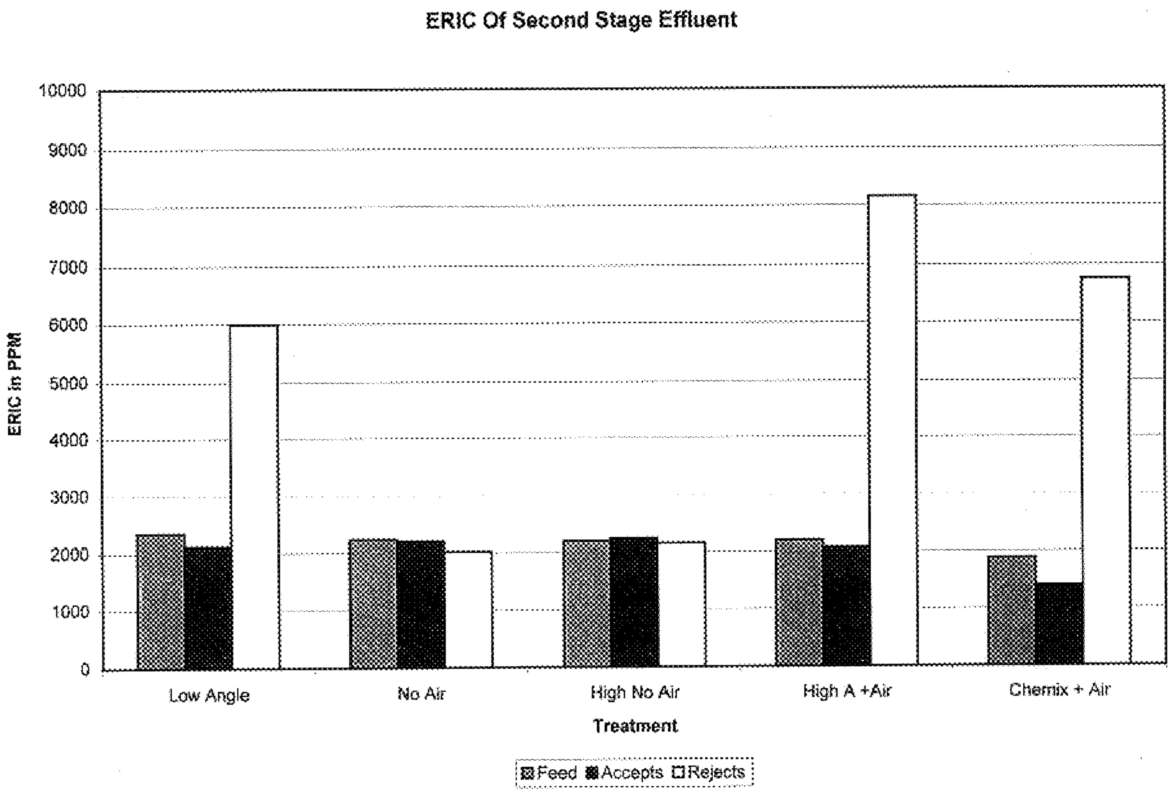
FIG. 15 is a graph showing the comparative effect on feed, accepts, and rejects pulp ERIC, measured in parts per million, under conditions with or without air, at high and low tube angles, and with a chemical mixer.

FIG. 15 is a graph showing the comparative effect on feed, accepts, and rejects pulp ERIC, measured in parts per million, under conditions with or without air, at high and low tube angles, and with a chemical mixer. The data demonstrates that the reject ERIC count at a low angle (with air) is 5,990, whereas a low angle with no air results in ERIC levels falling to 2,016, clearly indicating that air in the head box improves performance. The greatest amount of residual ink in the rejects occurred when the chamber was at a high angle and air was provided to the pulp in the head box. However, the lowest amount of residual ink occurred when the pulp was treated with the chemical mixer prior to introduction into the head box.

Figure 16:
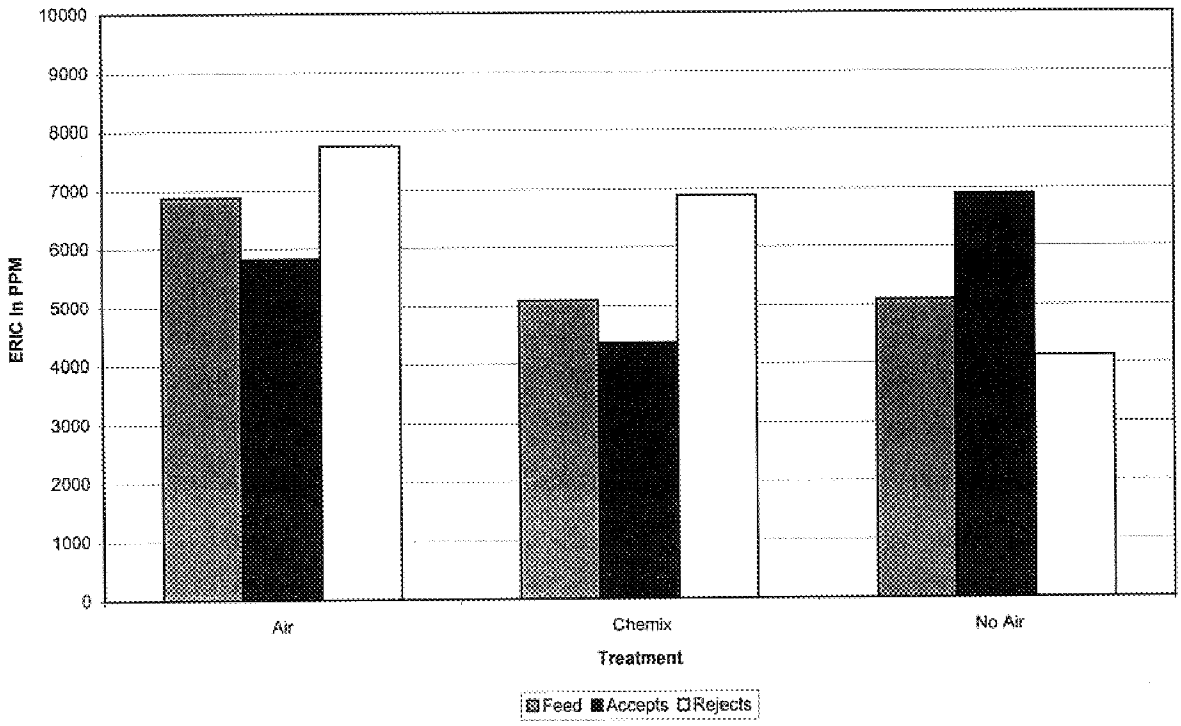
FIG. 16 is a graph showing the comparative effect on feed, accepts, and rejects pulp pressate ERIC, measured in parts per million, under conditions with or without air and a chemical mixer.

FIG. 16 is a graph showing the comparative effect on feed, accepts, and rejects pulp pressate ERIC, measured in parts per million, under conditions with or without air and a chemical mixer. Pulp pressate results from squeezing water from the solids after the washing step, but before the bleaching step in conventional de-inking. This graph demonstrates that the infusion of air in the head box provides a preferred amount of residual ink, as compared to no infusion of air. However, the use of the chemical mixer with air (middle columns) provided the largest relative increase in residual ink in the rejects with the lowest quantity of retained ink in the accepts.

Figure 17:
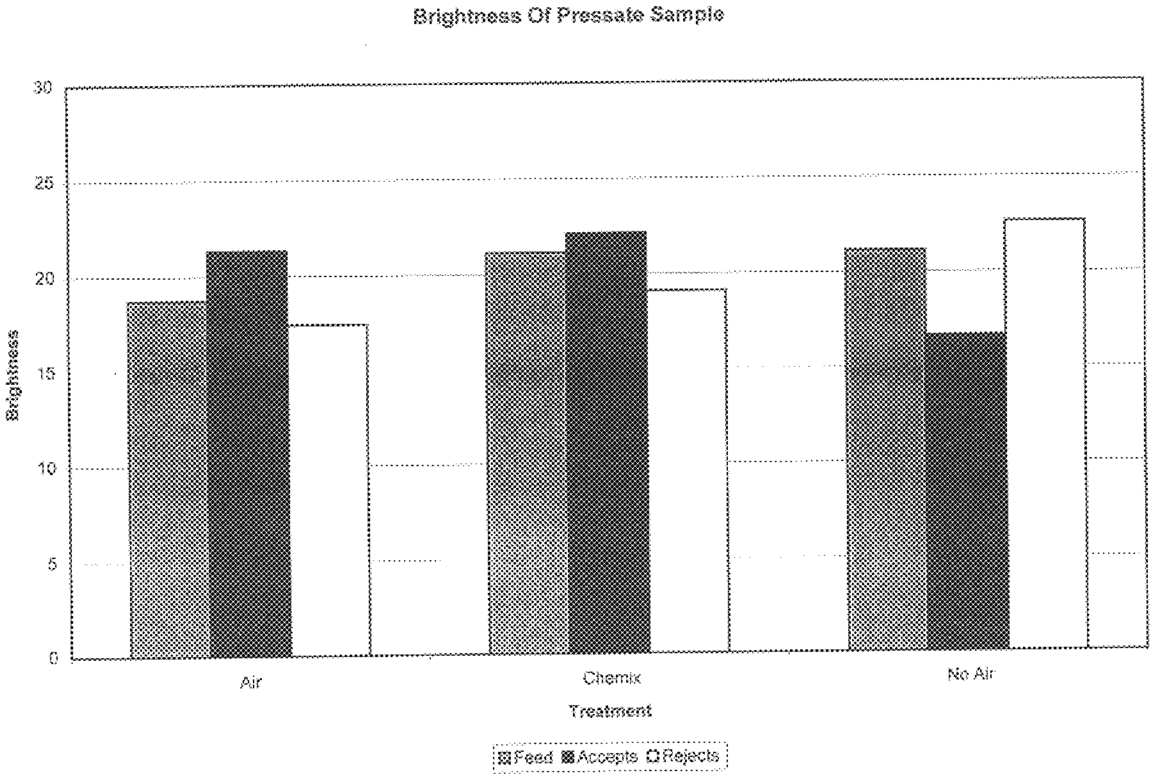
FIG. 17 is a graph showing the comparative effect on feed, accepts, and rejects pulp pressate ERIC, measured in parts per million, under conditions with or without air and a chemical mixer.

FIG. 17 is a graph showing the comparative effect on feed, accepts, and rejects pulp pressate ERIC, measured in parts per million, under conditions with or without air and a chemical mixer. These results correlate with those for FIG. 16. The greatest brightness gain occurred when air was infused into the pulp. The use of the chemical mixer also dramatically increased the brightness of the accepts.

EXAMPLE 5

A decontamination apparatus and a head box of the present invention were used in the following example to demonstrate the ability of the method and apparatus to remove emulsified wax from a pulp slurry containing recycled wax-lined cardboard. To facilitate the removal of wax, the temperature of the aqueous solution was raised above 120 degrees Fahrenheit. The greatest amount of wax removed as a light contaminate occurred when the temperature of the aqueous solution was raised to about 160 degrees Fahrenheit, an ethoxylated alcohol surfactant was added, and the liquid suspension was treated with a chemical mixer as previously described to provide agitation and air infusion, prior to directing the suspension into the decontamination apparatus.

The above examples are intended to be exemplary of certain embodiments of the invention, and are not intended to limit the scope of the invention and the following claims.

We claim:

1. A method for decontaminating a liquid suspension comprising:

a. infusing a gas into a contaminated liquid suspension; and b. directing the gas infused liquid suspension into an apparatus for removing light contaminates from a liquid suspension, said light contaminates having a specific gravity less than said liquid suspension, said apparatus comprising an elongated cell comprising i. a longitudinal axis and an interior surface defining a liquid suspension decontaminating chamber having a first cross section area;

ii. a liquid suspension receiving end;

iii. an opposed liquid suspension discharging end; and, iv. an enclosed light contaminate collection hood within an upper portion of the decontaminating chamber in fluid communication with the chamber and having an upper port for purging light contaminates therethrough.

2. The method of claim 1, wherein said infusing step occurs by means of a gas supply line disposed within a head box, wherein said head box is in fluid communication with an inlet tube, wherein said inlet tube is in fluid communication with said liquid suspension decontaminating chamber at said receiving end of said cell, said inlet tube having a cross section area less than said cross section area of said chamber.

3. The method of claim 1, wherein said gas is air.

4. The method of claim 1, wherein said gas is infused at a volume rate of approximately 0.1 to 15 percent of the total solids volume in the liquid.

5. The method of claim 1, wherein said liquid is a paper pulp slurry.

6. The method of claim 1, further comprising the earlier step of mechanically agitating the contaminated liquid suspension.

7. The method of claim 6, wherein said mechanically agitating step is achieved by means of a chemical mixer.

8. The method of claim 1, further comprising the earlier step of adding cationic or anionic dispersant particles to the contaminated liquid suspension.

9. The method of claim 8, wherein said dispersant particles are selected from tetrasodium pyrophosphate, sodium tripyrophosphate and polyacrylic acid.

10. The method of claim 1, wherein said light contaminates are ink, polymer or wax particles.

11. A method for decontaminating a liquid suspension comprising:

a. mechanically agitating a contaminated liquid suspension and infusing said agitated liquid suspension with a gas; and b. directing the agitated liquid suspension into an apparatus for removing light contaminates from a liquid suspension, said light contaminates having a specific gravity less than said liquid suspension, said apparatus comprising an elongated cell comprising i. a longitudinal axis and an interior surface defining a liquid suspension decontaminating chamber having a first cross section area;

ii. a liquid suspension receiving end;

iii. an opposed liquid suspension discharging end; and, iv. an enclosed light contaminate collection hood within an upper portion of the decontaminating chamber in fluid communication with the chamber and having an upper port for purging light contaminates therethrough.

12. The method of claim 11, wherein said liquid is a paper pulp slurry.

13. The method of claim 11, wherein said mechanically agitating step occurs by means of a chemical mixer.

14. The method of claim 11, wherein said infusing step occurs by means of a gas supply line disposed within a head box, wherein said head box is in fluid communication with an inlet tube, wherein said inlet tube is in fluid communication with said liquid suspension decontaminating chamber at said receiving end of said cell, said inlet tube having a cross section area less than said cross section area of said chamber.

15. The method of claim 14, wherein said gas is air.

16. The method of claim 11, wherein said gas is infused at a volume rate of approximately 0.1 to 15 percent of the total solids volume in the liquid.

17. The method of claim 11, further comprising the earlier step of adding cationic or anionic dispersant particles to the contaminated liquid suspension.

18. The method of claim 17, wherein said dispersant particles are selected from tetrasodium pyrophosphate, sodium tripyrophosphate and polyacrylic acid.

19. The method of claim 11, wherein said light contaminates are ink, polymer or wax particles.

* * * * *